United States Patent
Huang et al.

(10) Patent No.: US 7,549,167 B1
(45) Date of Patent: Jun. 16, 2009

(54) SELF-CLEANSING SYSTEM

(75) Inventors: Yih Huang, Fairfax, VA (US); Arun Sood, Clifton, VA (US)

(73) Assignee: George Mason Intellectual Properties, Inc., Fairfax, VA (US)

(*) Notice: Subject to any disclaimer, the term of this patent is extended or adjusted under 35 U.S.C. 154(b) by 692 days.

(21) Appl. No.: 10/821,195

(22) Filed: Apr. 9, 2004

Related U.S. Application Data (60) Provisional application No. 60/461,430, filed on Apr. 10, 2003.

(51) Int. Cl.
*G06F 11/00* (2006.01)
*G06F 12/16* (2006.01)
*G06F 15/18* (2006.01)
*G08B 23/00* (2006.01)

(52) U.S. Cl. .............. 726/23; 726/22; 726/25; 709/224; 709/225

(58) Field of Classification Search ............ 726/23
See application file for complete search history.

(56) References Cited

U.S. PATENT DOCUMENTS 6,880,089 B1 * 4/2005 Bommareddy et al. ........ 726/11

2002/0069369 A1 * 6/2002 Tremain ............... 713/201
2003/0028803 A1 * 2/2003 Bunker et al. ........... 713/201
2003/0033542 A1 * 2/2003 Goseva-Popstojanova et al. .................. 713/201

* cited by examiner

*Primary Examiner*—Matthew B Smithers
*Assistant Examiner*—Shewaye Gelagay
(74) *Attorney, Agent, or Firm*—David Yee; David Grossman (57) ABSTRACT

Disclosed is a self-cleansing system comprising at least two subsystems including an active subsystem and at least one available inactive subsystem. At least two of the subsystems may be connected to each other by a communications link and connected to an external network through a local network. An arbitration mechanism is capable of designating one of the at least one available inactive subsystem to be a designated active system. An active subsystem and a designated active subsystem may share an IP address, but only the active subsystem utilizes the IP address to output information to the external network. A transfer mechanism capable of deactivating the active subsystem and then activating a designated active system may be initiated by a transfer criterion. A self-cleansing mechanism may then cleanse the deactivated subsystem.

27 Claims, 8 Drawing Sheets

SELF-CLEANSING SYSTEM

CROSS-REFERENCE TO RELATED APPLICATIONS

The present application claims the benefit of provisional patent application Ser. No. 60/461,430 to Huang et al., filed on Apr. 10, 2003, entitled "Self-Cleansing Systems for Intrusion Containment," which is hereby incorporated by reference.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Grant No. DAMD17-01-1-0825, awarded by the Army Research Office, Medical Research Material Command.

BACKGROUND OF THE INVENTION

The present invention relates to the field of intrusion management systems. In particular, the present invention provides for a self-cleansing intrusion management system that may be implemented using highly-available computing systems.

Computer systems are becoming more complex and are increasingly vulnerable to cyber warfare. Typical (traditional) Intrusion Management Systems (IMS) are based on intrusion prevention and detection followed by implementation of intrusion resistance procedures. The latter generally includes intrusion tracking, subsystem isolation and system recovery. Such an IMS approach relies heavily on the ability to detect intrusion events in the first place.

However, assuming that a system can always detect and block all intrusion activities quickly enough to avoid significant damage is inappropriate given the sophistication and rapid evolution of information warfare. It is especially true for critical distributed computing systems: To achieve the highest level of security, one must not be overconfident in either their knowledge of enemy tactics and technologies or their capability to fend off all attacks.

What is needed is a secure system that constantly assumes that it may be compromised and thus performs self-cleansing, regardless of whether intrusion alarms actually occur.

BRIEF SUMMARY OF THE INVENTION

One advantage of the present invention is that it provides a defense against unknown or severe attacks that may defeat intrusion detection systems.

Another advantage of this invention is that it may use highly-available and inexpensive computing equipment.

A further advantage of this invention is that it may be used in many different networking computing environments such as firewalls and servers.

To achieve the foregoing and other advantages, in accordance with all of the invention as embodied and broadly described herein, is a self-cleansing system comprising: at least two subsystems, the at least two subsystems including an active subsystem and at least one available inactive subsystem; a communications link connecting the at least two subsystems; a local network capable of connecting the at least two subsystems to an external network; an arbitration mechanism capable of designating one of the available inactive subsystems to be a designated active system; an IP address shared by at least the active subsystem and the designated active subsystem, only the active subsystem utilizing the IP address to output information to the external network; a transfer mechanism capable of: deactivating the active subsystem, causing the active subsystem to become a deactivated subsystem; and activating the designated active subsystem, causing the designated active subsystem to become the active subsystem; and a self-cleansing mechanism capable of cleansing the deactivated subsystem, causing the deactivated subsystem to become one of the at least one available inactive subsystem.

In yet a further aspect of the invention, a method of self-cleansing a system comprising the iterative steps of: designating one of the at least one available inactive subsystem to be a designated active subsystem, the at least one available inactive subsystem being part of at least two subsystems, the at least two subsystems: include an active subsystem; are connected by a communications link; are capable of sharing an IP address; and are connected to a local network that is capable of connecting to an external network; and when a transfer criterion is satisfied: deactivating the active subsystem, causing the active subsystem to become a deactivated subsystem; activating the designated active subsystem, causing the designated active subsystem to become the active subsystem; and cleansing the deactivated subsystem, causing the deactivated subsystem to become one of the at least one available inactive subsystem; wherein only the active subsystem utilizes the IP address to output information to the external network.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated in and form a part of the specification, illustrate an embodiment of the present invention and, together with the description, serve to explain the principles of the invention.

REFERENCE NUMERALS IN DRAWINGS 100 self-cleansing system
120 subsystems group
122 subsystem 1

124 subsystem 2
126 subsystem n
130 shared IP address
140 transfer mechanism
142 arbitration mechanism
144 self-cleansing mechanism
150 local area network
160 external network
170 communications link
246 shared storage
341 transfer mechanism
346 criterion
380 auditor
382 integrity checker
S410 designate an available inactive subsystem to be an active subsystem
S415 transfer criterion satisfied?
S420 deactivate the current active subsystem
S430 activate the designated active subsystem
S440 cleanse the deactivated subsystem
S450 reclassify the cleansed deactivated subsystem as an available inactive subsystem
500 alternative self-cleansing system
502 subsystem A
504 subsystem B
510 available inactive subsystem A
520 designated active subsystem A
530 active subsystem A
550 active subsystem B
560 deactivated subsystem B
565 cleansing cycle
570 available inactive subsystem B
710 client
720 subnet A
730 firewall 1
740 subnet C
750 firewall 2
760 subnet B
770 VMWare Workstation
780 Host OS
790 PC Hardware
810 SCSI Hardrive
820 SCSI interface
822 SCSI interface
830 server box 1
832 server box 2
840 probe signals
850 network
860 client(s)

DETAILED DESCRIPTION OF THE INVENTION

The present invention is a self-cleansing intrusion tolerance (SCIT) system 100. In this SCIT system 100, a subsystem such as a server may be periodically assumed to have "failed," namely, compromised by undetected intrusion. Consequently, the server may be brought off-line for cleansing and integrity checking while a backup takes over. Indeed, a SCIT system 100 may be viewed as two mirror subsystems working alternatively than as a primary server and its backup. This patent discloses the concept of SCIT, along with several embodiments including a SCIT firewall and a SCIT server.

Figure 1:
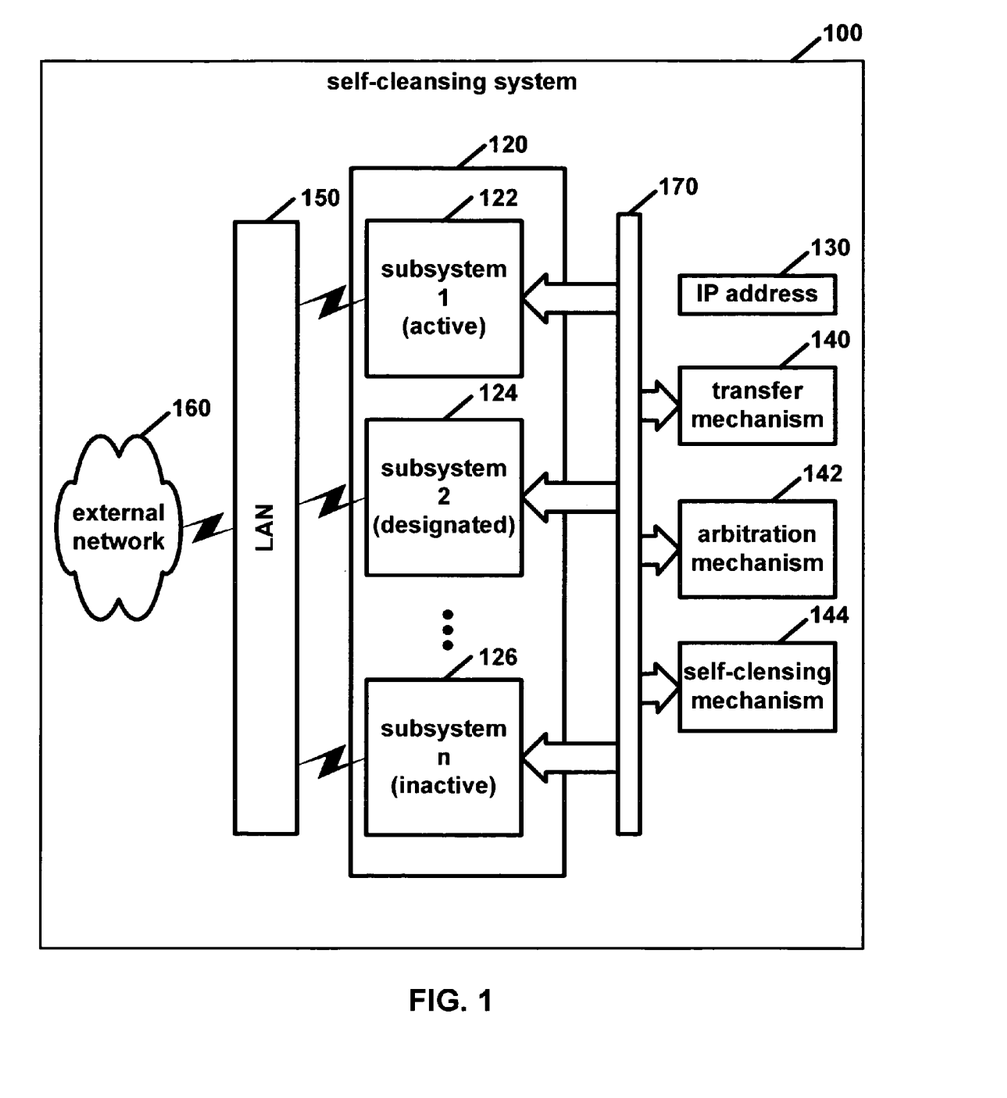
FIG. 1 shows a block diagram of a self-cleansing system as per an embodiment of the present invention.

This system 100 comprises at least two subsystems 120. Although the subsystems 120 need not be identical, they should have the capability of functioning identically with regard to the overall systems capabilities. As shown in FIG. 1, subsystems 122, 124, . . . 126 may be personal computers, each manufactured by a different manufacturer and containing non-identical hardware. Obviously, the individual capabilities of each of these discrete subsystems may be different; however, each of these discrete subsystems must be capable of performing their critical functions as viewed from external locations such as a local area network (LAN) 150. In addition, the functions of subsystems 120 should depend upon the desired characteristics of the overall system. For example, self-cleansing system 100 may be functioning as a firewall. In this case, the self-cleansing system 100 should include at least two subsystems that may function as firewalls.

Similarly, the subsystems 100 may be servers or gateways. Servers may include any type of computing equipment that can store and provide data such as DNS servers, file servers, print servers, directories, and databases. Examples of gateways include IP security gateways, routers, and switches.

Figure 2:
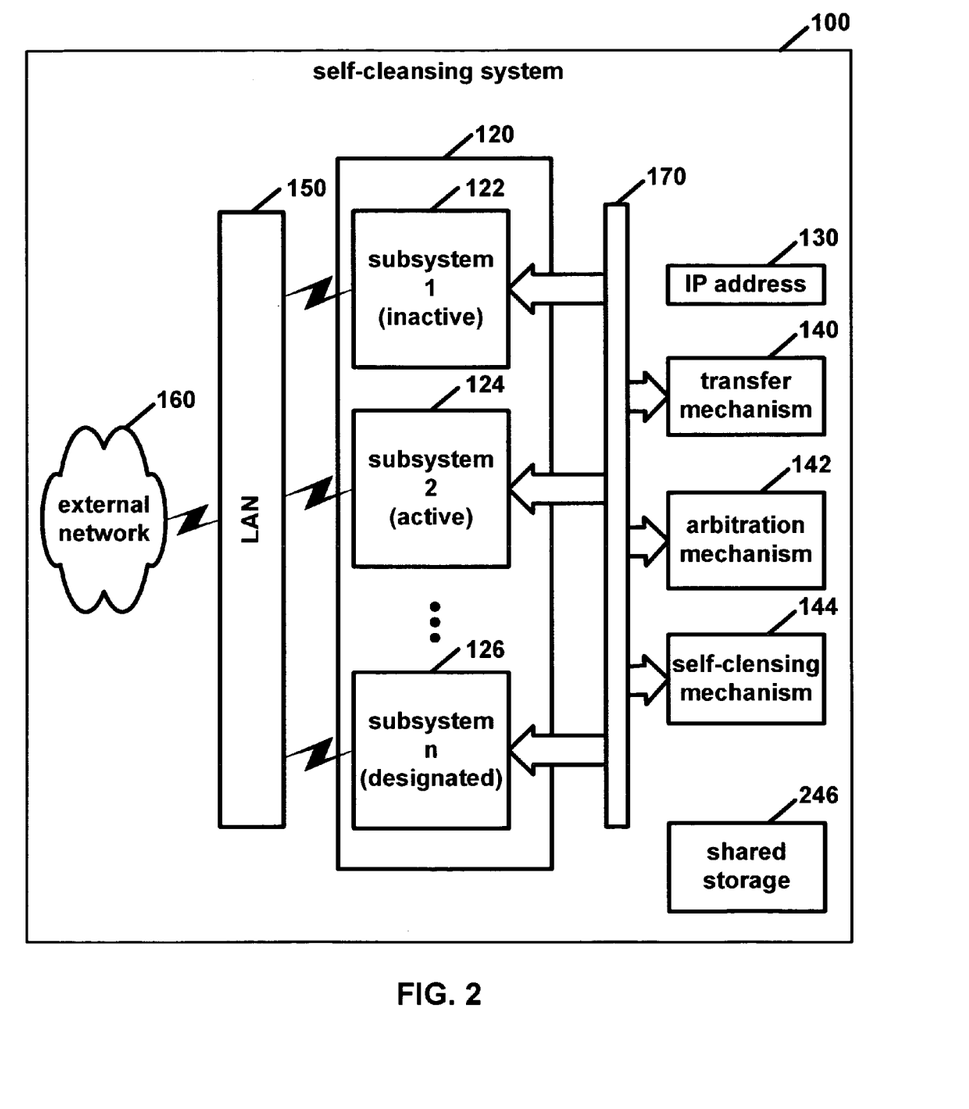
FIG. 2 shows a block diagram of a self-cleansing system as per an embodiment of the present invention showing the addition of shared storage.

Of these subsystems 122, 124, . . . 126, one should be an active subsystem (shown in FIG. 1 as subsystem 122 and in FIG. 2 as subsystem 124) and at least one of the others should be an available inactive subsystem (shown in FIG. 1 as subsystem 126 and in FIG. 2 as subsystem 122). Note should be made that the terms active subsystem, available inactive subsystem, inactive subsystem, and designated active system are all designations that are used to show the active designation of a subsystem at a particular point in time. To illustrate this point, FIGS. 1 and 2 show various subsystems as having different designations. For example, an inactive subsystem is shown in FIG. 1 as subsystem 126 and in FIG. 2 as subsystem 122; and active subsystem is shown in FIG. 1 as subsystem 122 and in FIG. 2 as subsystem 124, and a designated active system is shown in FIG. 1 as subsystem 124 and in FIG. 2 as subsystem 126. For the sake of clarity, future references should be assumed to be made to FIG. 1 designations unless specifically stated otherwise.

An active subsystem 122 is a subsystem that is required to perform system functions and is required to communicate with external network 160. An inactive subsystem 126 is a subsystem that is not required to perform system functions and is not supposed to communicate with external network 160. An inactive subsystem may be available or not available to be designated as an active subsystem 124. This availability may be based upon many criterions such as hardware status or software status. A designated active subsystem 124 is a subsystem that is ready to perform system functions but is not supposed to communicate with external network 160. Basically, a designated active system 124 has the status of being an active system in waiting.

A communications link 170 may connect at least two of the subsystems 122, 124, . . . 126. This communications link 170 may also be part of a local area network 150 capable of connecting at least two of the subsystems 122, 124, . . . 126 to an external network 160. This external network 160 is external relative to the subsystems 120. The external network 160 may include many different networks or devices such as clients, computing networks, communications networks, and the public Internet.

An arbitration mechanism 142 is used to designate an inactive subsystem 126 to be a designated active system 124. The arbitration mechanism 142 may use a criterion 346 to select which of the available inactive subsystem(s) 126 is to be designated as an designated active subsystem 124. The criterions may include system metrics or characteristics such as subsystem speed, time of availability, subsystem functionality, and subsystem capacity.

The active subsystem 122 and the designated active subsystem 124 share an IP address 130. However, only the active subsystem 122 uses the IP address 130 to output information to the external network 160. The designated active system 124 may be able to hear and operate on all of the data exchanged between the active subsystem 122 and the external network 160. Preferably, this parallel operation of these subsystems allows the designated active subsystem 124 to be prepared to take over as an active subsystem at any time. An illustration of this may be seen by noting that subsystem 124 has changed status from a designated active subsystem in FIG. 1 to an active subsystem in FIG. 2.

A transfer mechanism 140 is capable of directing the transfer of the subsystems. A basic transfer consists of (1) deactivating the active subsystem, causing the active subsystem to become an inactivate subsystem; and (2) activating a designated active subsystem, causing the designated active subsystem to become an active subsystem. Subsystem transfers may be seen between FIGS. 1 and 2 and 3 sequentially. For example, subsystem 122 is transferred from an active state in FIG. 1 to an inactive state in FIG. 2; subsystem 124 is transferred from an active state in FIG. 2 to an inactive state in FIG. 3; subsystem 124 is transferred from a designated active state in FIG. 1 to an active state in FIG. 2; and subsystem 126 is transferred from a designated active state in FIG. 2 to an active state in FIG. 3. The transfer mechanism 140 may be activated by a transfer criterion 346 (shown in FIG. 3).

The transfer criterion 346 may consider one or a combination of distinct criterions such as a fault detection criterion or an intrusion detection criterion. Further, factors such as time may be part of the transfer criterion 346. For example, a timer may be used to trigger transfer criterion 346 on regular intervals. Likewise, a clock may be used to trigger transfer criterion 346 at specific times A self-cleansing mechanism 144 may clean a recently deactivated subsystem such as subsystem 122 in FIG. 2 or subsystem 126 in FIG. 3. Many methods of self cleansing may be used. For example, the self-cleansing mechanism may include a capability to reboot at least one of the subsystems 120. Another example includes scanning a subsystem for the existence of harmful content such as viruses or worms and then inactivating the discovered harmful content. Once cleaned, the deactivated subsystem may become an available inactive subsystem(s).

Figure 3:
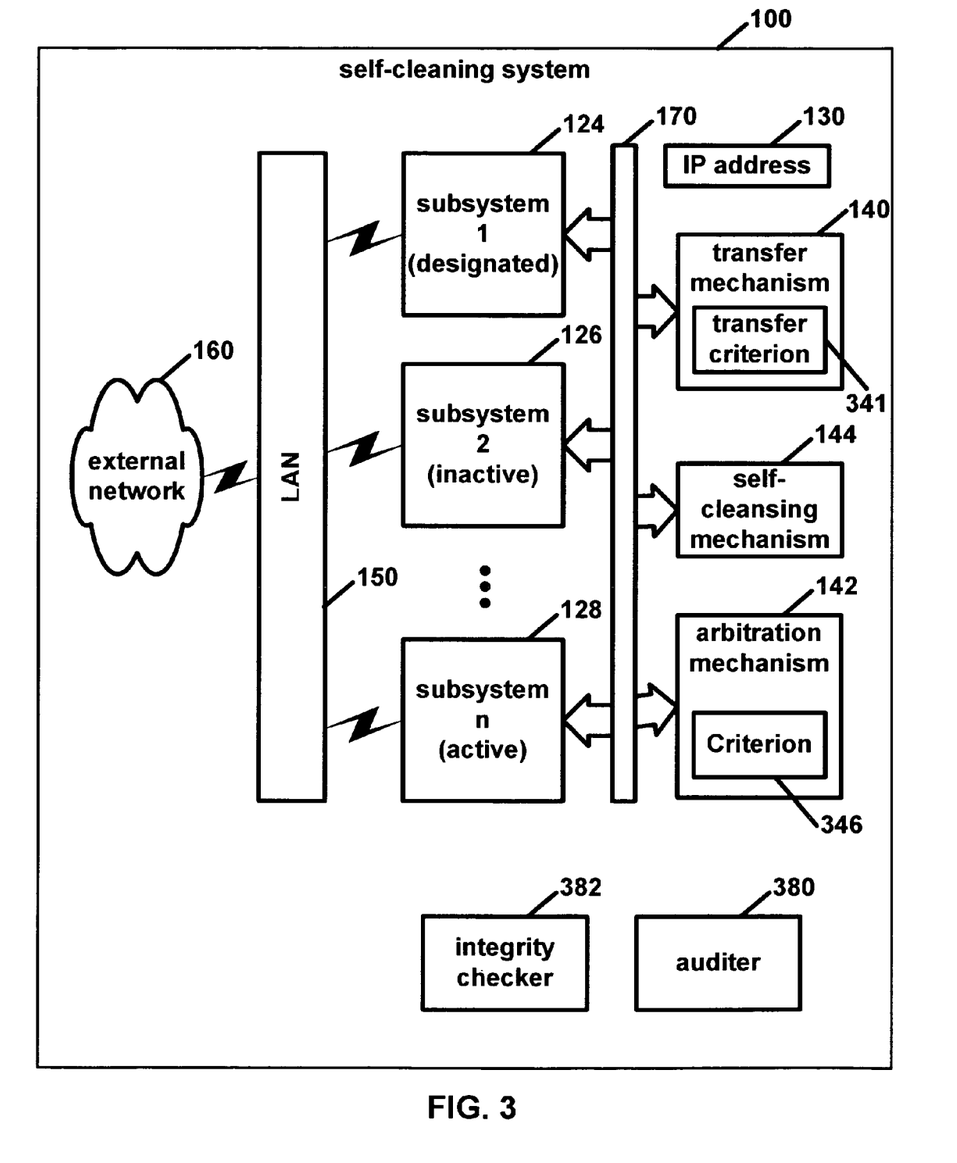
FIG. 3 shows a block diagram of yet another embodiment of a self-cleansing system as per the present invention.

The self-cleansing system 100 may further include an integrity check capability 382 as shown in FIG. 3. This capability may be used to verify that that the self-cleansing process has left a cleaned subsystem in adequate form to take over operation. Preferably, an integrity check will verify that the subsystem has been restored to an operational status with any effects of an attack removed.

An audit capability 380 may also be desirable. This capability may audit aspects of the system 100 such as measurable events, self-cleansing, and system performance. Further, this audit capability may record any of these events for further historical archives or analysis.

The system 100 may also include shared storage 246 accessible by at least two of the subsystems 120. This storage 246 may be used to share data among the subsystems 120. In addition, this shared storage 246 could be cleaned independent of the subsystems 120.

It is envisioned that in some systems, the active subsystem 122 may actually be a plurality of active subsystems. The subsystems may be combined and used according to various topologies to serve differing desires. In such a system, inactive subsystems 126 may be substituted for any of the active subsystems 122.

In addition, the subsystems 120 may be connected to a local network 150 that is capable of connecting to an external network 160. Both the active subsystem 122 and the designated active subsystem 124 should be capable of sharing an IP address 130.

Figure 4:
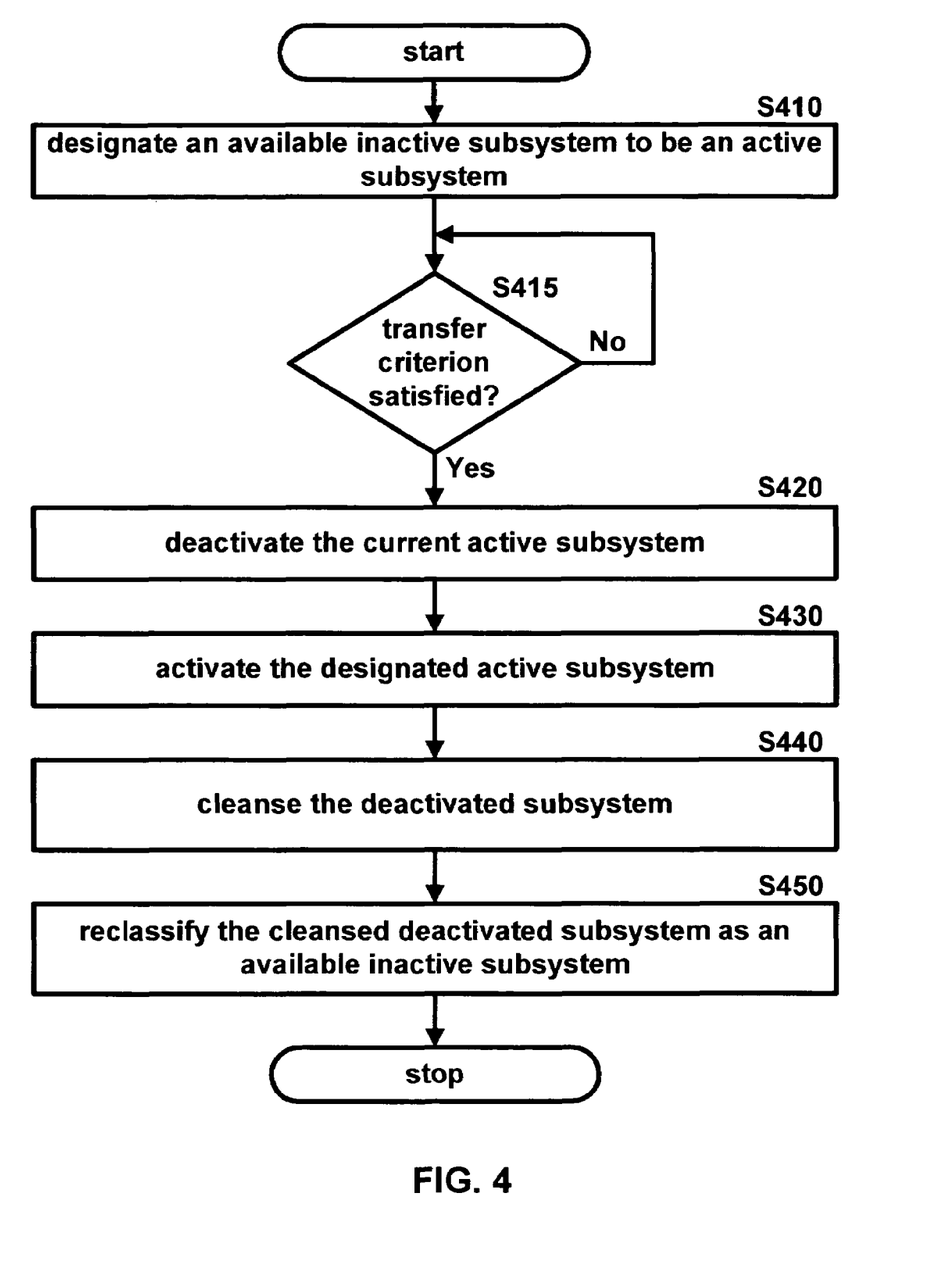
FIG. 4 shows a flow diagram of a transfer and cleansing process as per an embodiment of the present invention.
Figure 5:
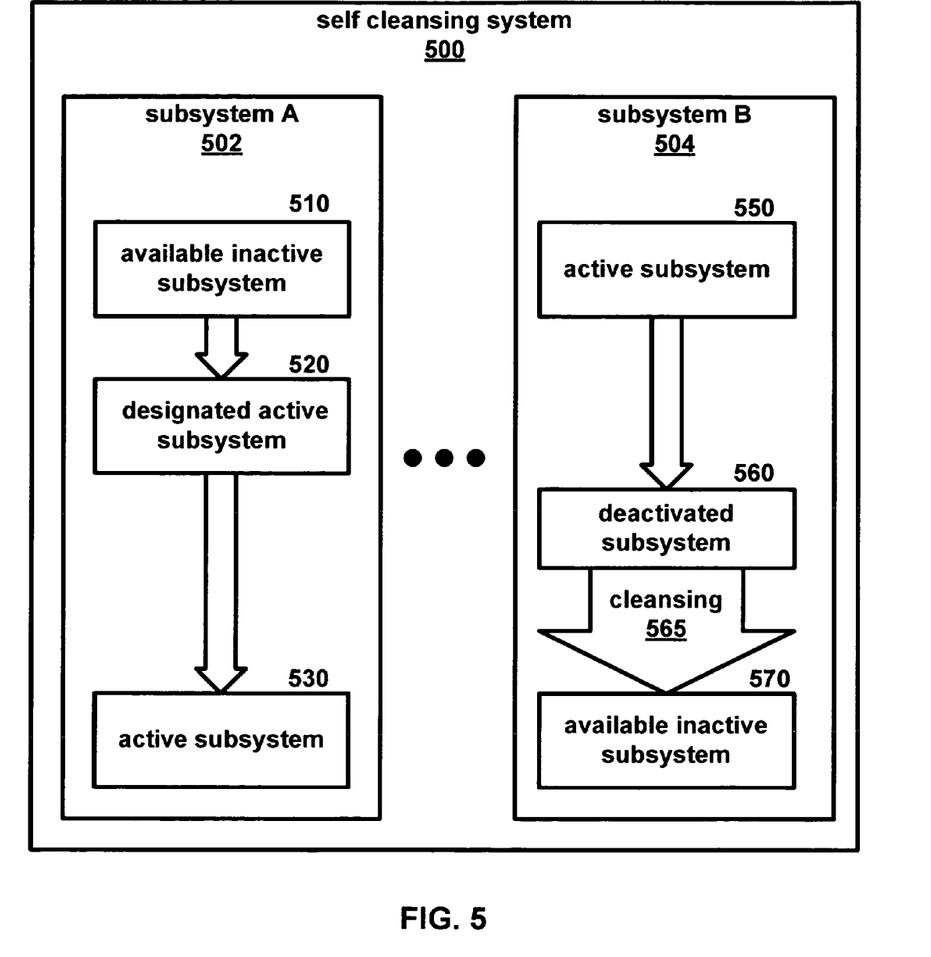
FIG. 5 shows a block diagram of two subsystems changing state as per an embodiment of the present invention.

Referring to FIGS. 4 and 5, we will now show a self-cleansing cycle. FIG. 4 is a flow diagram showing some of the steps that may take place during this operation. FIG. 5 is a block diagram showing the designated active states of two subsystems 502 and 504 through a transfer. At step S410, at least one available inactive subsystem 510 is designated to become an active subsystem 520. The system 500 is then allowed to perform in its current state until a transfer criterion is satisfied at step S415. Once the transfer criterion is satisfied, active subsystem 550 is deactivated at step S420, causing active subsystem 550 to become a deactivated subsystem 560. Next, designated active subsystem 520 may be activated at step S430, causing designated active subsystem 520 to become active subsystem 530. At step S440, deactivated subsystem 560 may be cleansed, causing deactivated subsystem 560 to become an available inactive subsystem 570 at step S450. Throughout this cycle, only an active subsystem 530 or 550 may utilize an IP address to output information to an external network.

Step S410, where one of at least two subsystems is designated to be a designated active subsystem, may use a criterion to select which of the available inactive subsystems is to be designated the designated active subsystem.

The transfer criterion at step S415 may consider detected faults or intrusions. Further, the transfer criterion may consider time. For example, a system may be built according to the present invention where a transfer criterion is satisfied when either a fault in an active system is detected, an intrusion into an active system is detected, or a predetermined amount of time has lapsed since the last transfer cycle.

The steps shown in FIG. 4 are not exclusive to the present invention. For example, it is anticipated that several other steps could be included such as checking the integrity of a deactivated subsystem to determine if the deactivated system is capable of being returned into service. Other steps may include auditing the system cleansing actions.

One implementation of self-cleansing involves rebooting a subsystem from a trusted storage device followed by, if necessary, system recovery, checkpoint, rollback, and data integrity checking routines. Examples of trusted storage devices include read-only storage devices or a nonvolatile storage where information is cryptographically signed. System availability may be achieved by means of redundancy, that is, a second mirror system that may be brought online to provide services. In this way, SCIT may be considered as a branch of high-availability computing. In a highly available system, sufficient hardware redundancy is preferably built into the system so that a backup can immediately replace a failed system. In SCIT, the switching from one system to its mirror may not only be triggered by failures, it may be a regular routine designed to root out undetected intrusion activities.

An illustrate application of SCIT as per the present invention is a SCIT firewall. Here the decision of whether to drop a packet may be strictly made on a per-packet basis. Firewalls are widely used to block undesirable, potentially hostile packets at the entry to a secure site. A successful and unnoticed firewall subversion may leave the door to a site open, exposing the internals of a victimized site to the outside world. Referring back to FIG. 1, we may simply use two or more subsystems 120. When one subsystem 122 is working, another subsystem may be performing self-cleansing by rebooting itself. Assuming that rebooting is from read-only devices, a rebooted subsystem may be in a clean state and may again perform packet filtering needed to protect the site. As such, even if the enemy managed to break into one subsystem, its control over that subsystem is limited to one self-cleansing cycle. Of course, it is envisioned that more complicated SCIT systems may be built as discussed later.

Figure 6:
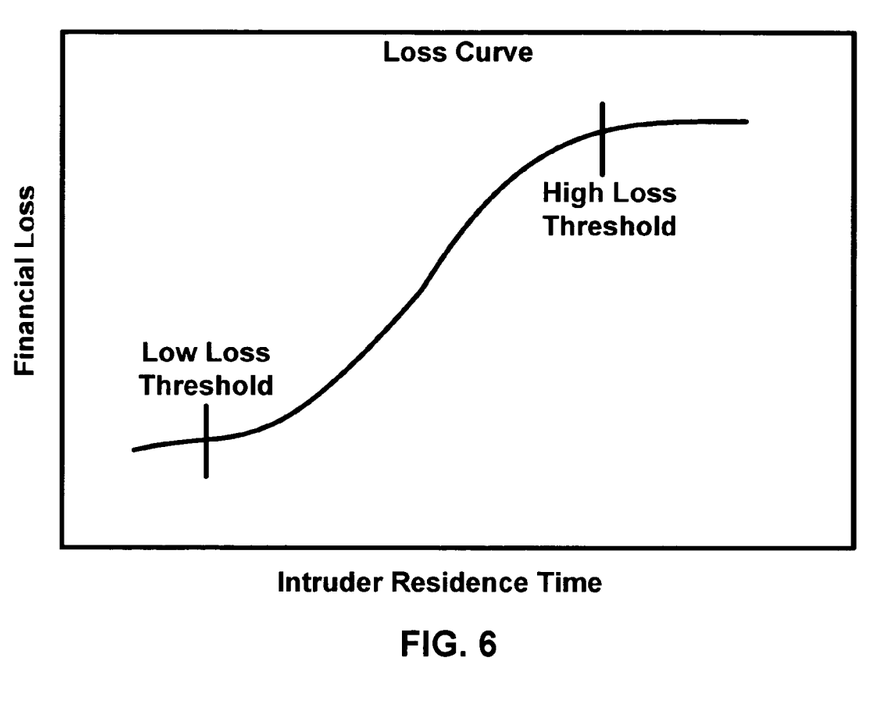
FIG. 6 shows a loss curve.

System self-cleansing limits the amount of time that a successful intruder has to stay in the system and inflict damages. The longer this Intruder Residence Time, the greater the damage and loss as illustrated in FIG. 6. As shown, the loss curve may be an S-curve. If the Intruder Residence Time is less than the low loss threshold, then the cost of the intrusion is low, while an Intruder Residence Time greater than the high loss threshold will lead to near max loss. The steep slope between the two thresholds indicates that it is necessary to limit the Intruder Residence Time to less than the low loss threshold. The low loss threshold reflects the reality that it takes a certain time window for a hacker to be able to issue malicious commands, exploit backdoors, install Trojan horse programs, and/or steal/destroy data. A conservative estimate of the low loss threshold is in the range of minutes. Although there is no hard data for building the loss curve, there are reports that can help the process of building such a curve. For example, in the context of on-line banking, security experts believe that a theft of $5,000 to $10,000 may be carried out over a few weeks, while larger losses up to $1 million are likely to take four to six months. In this context it is emphasized that the loss curve must account for the possibility that the Intruder Residence Time is spread over more than one successful breach of the system.

The present invention complements and strengthens existing intrusion prevention and detection technologies. One skilled in the art practicing the present invention does not need to eliminate the use of current intrusion management systems, but rather may use this invention to add another layer of defense, extending the idea of system "defense-in-depth" through periodic system cleansing. The effectiveness of SCIT may depend on fast self-cleansing cycles, restricting the attackers to a very short time window to breach the system and cause harms.

A preferred embodiment of the preset invention is a SCIT firewall. The operation of stateless firewalls lends itself to SCIT, owing to the relative ease for a backup or mirror system to take over without disrupting ongoing traffic. Further, firewalls form the first line of defense for many private networks and thus are obvious targets of intrusion attacks. Strengthening the defense of firewalls significantly reduces the risk of security breaches in the whole network. The applications of the present invention to more complex systems, such as NFS, DNS, and Web servers are anticipated and discussed later.

Figure 7:
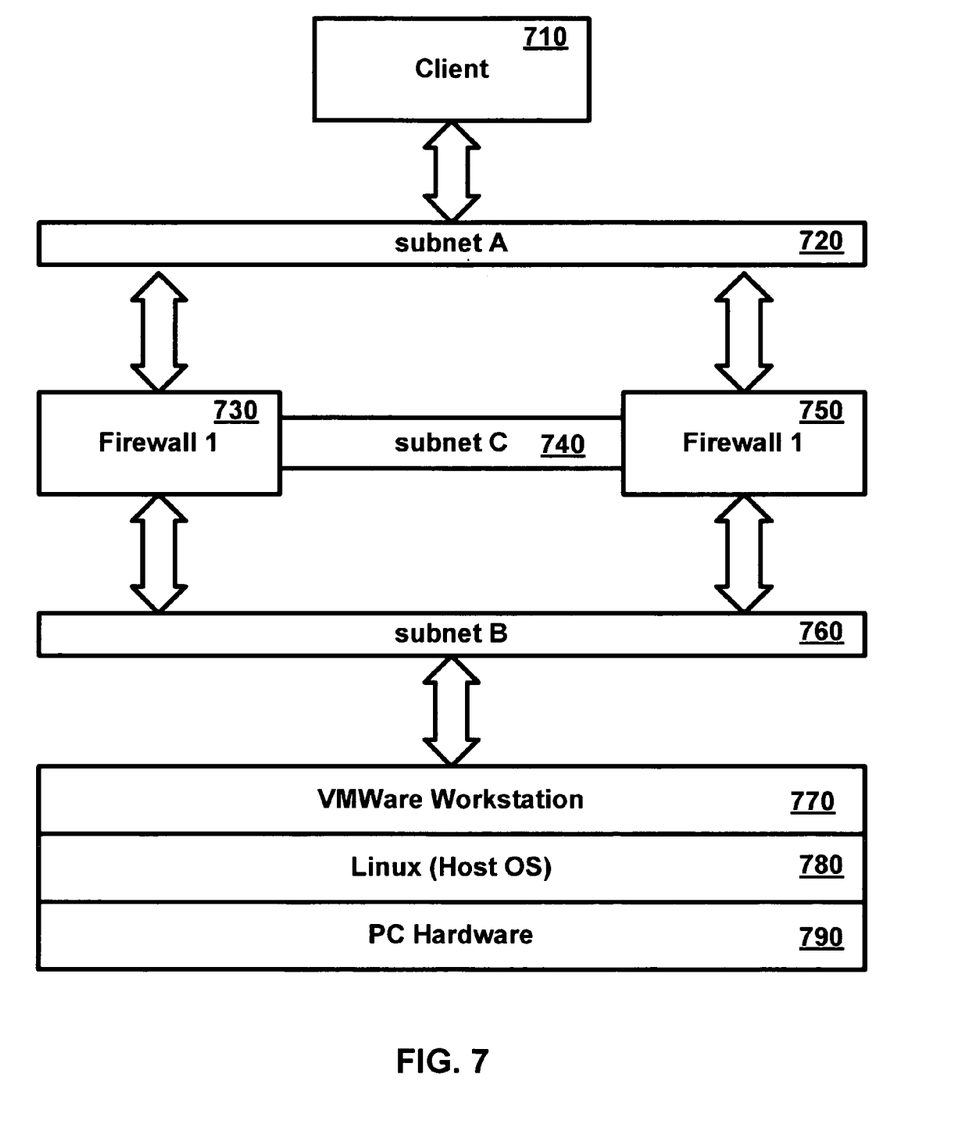
FIG. 7 shows a block diagram of a self-cleansing firewall system as per an embodiment of the present invention.

Referring to FIG. 7, we see an illustrative example of the present invention as a firewall. A client 710 may use a browser such as Microsoft Explorer on an operating system such as Microsoft Windows to surf the web. The client Windows may connect to an internal network 720 then be protected by SCIT firewalls 730 and 750. Both the client Windows machine 710 and its SCIT firewalls 730 and 750 may be implemented as virtual machines running under Virtual Machine software 770 from VMWare, Inc. The underlying host machine may be a PC 790 such as a Pentium 4 PC running RedHat 7.2 Linux 780. Using VMWare supports not only virtual machines but also virtual networks, which are emulated switched Ethernet networks. As seen in FIG. 7, this feature may be used to build two virtual networks, subnet A 720 and subnet B 760. Each subnet may have its own subnet ID. For example, subnet A 720 may have a subnet ID of 192.168.181.0/24 and subnet B 760 may have a subnet ID of 192.168.202.0/24. Subnet B may connect the host system to the two firewalls 730 and 750. Both firewalls may use a specialized version of RedHat 7.2 Linux.

Subnet A 720 may connect the firewalls to the client Windows. Inbound traffic may be received by the host and relayed to one of the firewalls 730 or 750, which filters and relays the traffic to the client Windows 710. A third subnet C 740 having a third distinct IP address such as 192.168.88 may be used by the two firewalls 730 and 750 to probe each other. To enable the client Windows 710 to communicate with the public Internet, its private IP address may be translated to a public IP address by IP Masquerading, a form of network address translation that is supported by Linux kernels.

When a newly cleansed firewall is ready for operation, it must take over the IP addresses used by the presently running firewall. The firewall achieves this by issuing Gratuitous ARP messages using the Fake package. The firewall rules may be implemented in IPCHAINS, a widely supported kernel feature of Linux systems. A shell script that executes the following steps may control the operations of each firewall. In the script, the first step may be executed immediately after the underlying firewall has completed rebooting.

1. Setup firewall rules using the IPCHAINS command. Start traffic filtering and relaying in the background. (The two tasks should continue to be performed in the background until the machine is shutdown for rebooting in Step 5).
2. Broadcast on subnets A 720 and B 760 Gratuitous ARP messages to announce the ownership of firewall IP addresses. (This step should last approximately 10 seconds, around one ARP message per second).
3. Wait for 10 seconds. (This delay gives the other firewall extra time to detect the activities of this firewall and to reboot).
4. This firewall now assumes the other firewall is rebooting. It sends ping messages periodically over the subnet C 740 to probe the other firewall until a reply message is received. (The receipt of a reply indicates the other firewall has completed self-cleansing and is ready to take over).
5. Reboot (and thus return to step 1 after completion).

In general, for a typical HTML encoded web page, a firewall switch should be barely perceptible. Examination of a trace may sometimes show occasional losses of packets when switching firewalls, but retransmission of the packets are generally fast enough that the user should not perceive the difference.

Finally, it is worth pointing out that the self-cleansing of a firewall in the above example comprises merely rebooting the firewall. Assuming that the firewall is booted entirely from read-only storage, rebooting is sufficient to bring it to a clean state. While this assumption is reasonable for relatively simple devices like firewalls, in general, it is envisioned that more involved self-cleansing procedures may be used. Further, using system audit tools, such as Tripwire (see www.tapwire.com), a system audit may be carried out after rebooting to check the integrity of system files.

The present invention may be extended to various types of servers in distributed computing environments. This task may be called the "SCIT-ization" of servers.

Stateless servers are relatively straightforward to SCIT-ize. Stateless means that the server does not have to keep track of the outcomes of previous tasks in memory in order to carry out new tasks. NFS is a prominent example of stateless systems. Notice that dependences on the previous outcomes maintained in nonvolatile storage can be managed by SCIT, for mirror systems may share the storage. Storage sharing may be achieved by, for example, a SCSI bus in a small-scale system or a system-wide network (SAN) in a large cluster.

Servers that handle short sessions are relatively straightforward to SCIT-ize. Such servers are typically transaction oriented and process request-and-response types of tasks. Examples include DNS servers, some database servers, and certification servers. Telnet, FTP, and many application proxy servers are examples of long-session servers. A long session in a SCIT system may need to be migrated to a mirror system in the middle of the session. The task may involve moving endpoints of TCP connections on the fly.

Servers that manage static or semi-static data are relatively easy to SCIT-ize. A DNS, LDPA, or certification server, for instance, handles datasets that are typically small and infrequently changed. Static, small datasets enable efficient data mirroring and thus facilitate the construction of identical servers to operate alternatively. Due to the critical roles played by DNS and certification servers, SCIT technologies specifically developed for these servers may further strengthen overall system security.

The present invention should be compatible with many types of computing systems. SCIT should be particularly applicable to many important servers in distributed computing environments or Internet services, such as file systems, web servers, DNS servers, and certification services.

Figure 8:
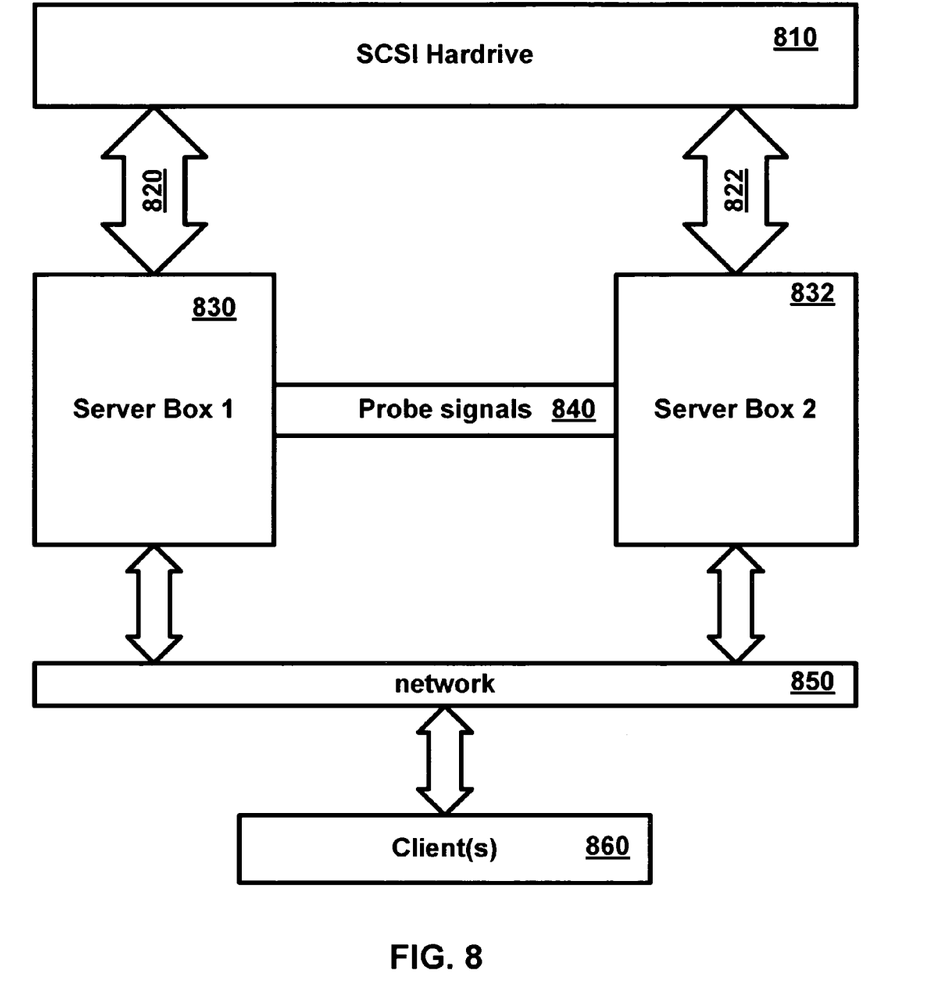
FIG. 8 shows a block diagram of a self-cleansing server system as per an embodiment of the present invention.

FIG. 8 is an example of how the present invention may be applied to create an SCIT NFS server. The design is based on a high-availability file server architecture. As shown in FIG. 8, two server machines 830 and 832 may connect to a SCSI bus 820 and 822 to share a SCSI hard drive 810 that stores file system data. Similar to the SCIT firewalls, the two server boxes 830 and 832 must share one IP address using the technique described earlier and connect to clients 860 using a network 850. Also, a second set of network interfaces 840 may be used by the currently running server to probe the status of the other server.

Disclosed is a novel application of high-availability computing, namely, intrusion containment. This SCIT approach uses multiple, identical servers to execute in turn, allowing off-line servers to be checked for integrity and cleansed to return to a clean state. These self-cleansing activities occur periodically, regardless of the presence/absence of intrusion alarms. As such, SCIT provides a defense against unknown or severe attacks that defeat the intrusion detection system. The effectiveness of SCIT may take advantages of fast self-cleansing cycles, restricting the attackers to a very short time window to breach the system and inflict damages. The cost of hardware redundancy in SCIT systems may be avoided by using the virtual machine technology, as demonstrated in our SCIT firewall prototype.

The foregoing descriptions of the preferred embodiments of the present invention have been presented for purposes of illustration and description. They are not intended to be exhaustive or to limit the invention to the precise forms disclosed, and obviously many modifications and variations are possible in light of the above teaching. The illustrated embodiments were chosen and described in order to best explain the principles of the invention and its practical application to thereby enable others skilled in the art to best utilize the invention in various embodiments and with various modifications as are suited to the particular use contemplated. For example, one skilled in the art will recognize that although the current best mode of this invention uses the self-cleansing method of rebooting followed possibly by data integrity checks and system audits, many layers of cleansing activities may be practiced in a SCIT system. In addition to rebooting the servers, one may kill and re-launch the server daemon. This process-level cleansing may impose less overhead, compared to system rebooting. Yet another system cleansing method may be to re-load dynamic kernel modules, in the attempt to clean up those kernel codes potentially contaminated by hostile communications. With self-cleansing activities occurring at several levels of the system and at different frequencies, SCIT may make it very difficult for attackers to cause actual harms, even if they are able to penetrate existing intrusion defenses.

What is claimed is:

1. A self-cleansing system that performs routine and cyclical, self-cleansing activities without waiting for or detecting a system failure comprising:
   a) at least two subsystems, said at least two subsystems including an active subsystem and at least one available inactive subsystem, wherein said active subsystem is automatically assumed to have failed regardless of whether said active subsystem actually has failed;
   b) a communications link connecting said at least two subsystems;
   c) a local network connecting said at least two subsystems to an external network;
   d) an arbitration mechanism designating one of said at least one available inactive subsystem to be a designated active system;
   e) an IP address shared by at least said active subsystem and said designated active subsystem, only said active subsystem utilizing said IP address to output information to said external network;
   f) a transfer mechanism:
      i) deactivating said active subsystem, causing said active subsystem to become a deactivated subsystem; and
      ii) activating said designated active subsystem, causing said designated active subsystem to become said active subsystem; and
   g) a self-cleansing mechanism automatically cleansing said deactivated subsystem, causing said deactivated subsystem to become one of said at least one available inactive subsystem.

2. A system according to claim 1, wherein said arbitration mechanism uses a criterion to select which of said at least one available inactive subsystem is to be designated said designated active subsystem.

3. A system according to claim 1, wherein said transfer mechanism is activated by a transfer criterion.

4. A system according to claim 3, wherein said transfer criterion is a fault detection criterion.

5. A system according to claim 3, wherein said transfer criterion is an intrusion detection criterion.

6. A system according to claim 3, wherein said transfer criterion considers time.

7. A system according to claim 1, wherein at least two of said at least two subsystems are firewalls.

8. A system according to claim 1, wherein at least two of said at least two subsystems are servers.

9. A system according to claim 1, wherein at least two of said at least two subsystems are gateways.

10. A system according to claim 1, further including an integrity check capability.

11. A system according to claim 1, further including an audit capability.

12. A system according to claim 1, wherein said self-cleansing mechanism includes a capability to reboot at least one of said at least two subsystems.

13. A system according to claim 1, further including shared storage accessible by at least two of said at least two subsystems.

14. A system according to claim 1, wherein said communications link is part of said local network.

15. A system according to claim 1, wherein said active subsystem is a plurality of active subsystems.

16. A method of self-cleansing a system by performing routine and cyclical, self-cleansing activities without waiting for or detecting a system failure comprising the iterative steps of:
- a) designating one of at least one available inactive subsystem to be a designated active subsystem, said at least one available inactive subsystem being part of at least two subsystems, said at least two subsystems:
  - i) include an active subsystem, wherein said active subsystem is automatically assumed to have failed regardless of whether said active subsystem actually has failed;
  - ii) are connected by a communications link;
  - iii) sharing an IP address; and
  - iv) are connected to a local network that is connected to an external network;
- b) when a transfer criterion is satisfied:
  - i) deactivating said active subsystem, causing said active subsystem to become a deactivated subsystem; and
  - ii) activating said designated active subsystem, causing said designated active subsystem to become said active subsystem; and
- c) automatically cleansing said deactivated subsystem, causing said deactivated subsystem to become one of said at least one available inactive subsystem;

wherein only said active subsystem utilizes said IP address to output information to said external network.

17. A method according to claim 16, wherein said step of designating one of at least two subsystems to be a designated active subsystem uses a criterion to select which of said at least one available inactive subsystem is to be designated said designated active subsystem.

18. A method according to claim 17, wherein said transfer criterion is a fault detection criterion.

19. A method according to claim 17, wherein said transfer criterion is an intrusion detection criterion.

20. A method according to claim 17, wherein said transfer criterion considers time.

21. A method according to claim 16, wherein at least two of said at least two subsystems are firewalls.

22. A method according to claim 16, wherein at least two of said at least two subsystems are servers.

23. A method according to claim 16, wherein at least two of said at least two subsystems are gateways.

24. A method according to claim 16, further including the step of checking the integrity of at least one of said deactivated subsystem.

25. A method according to claim 16, further including the step of auditing said system cleansing actions.

26. A method according to claim 16, wherein said step of cleansing said deactivated subsystem includes rebooting said deactivated subsystems.

27. A method according to claim 16, wherein said active subsystem is a plurality of active subsystems.

\* \* \* \* \*